United States Patent
Tsuda et al.

(10) Patent No.: US 9,224,585 B2
(45) Date of Patent: Dec. 29, 2015

(54) DOSE-RATE MEASURING SYSTEM

(71) Applicant: Mitsubishi Electric Corporation, Chiyoda-ku (JP)

(72) Inventors: Hiroyuki Tsuda, Chiyoda-ku (JP); Kenichi Moteki, Osaka (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 155 days.

(21) Appl. No.: 14/063,135

(22) Filed: Oct. 25, 2013

(65) Prior Publication Data

US 2015/0115165 A1   Apr. 30, 2015

(30) Foreign Application Priority Data

Jul. 2, 2013 (JP) ................................. 2013-138619

(51) Int. Cl.
*H01J 47/02* (2006.01)
*H01R 4/72* (2006.01)
*H02G 15/196* (2006.01)

(52) U.S. Cl.
CPC . *H01J 47/02* (2013.01); *H01R 4/72* (2013.01); *H02G 15/196* (2013.01)

(58) Field of Classification Search
CPC ........... H01J 47/02; G01T 1/185; G01T 3/008
See application file for complete search history.

(56) References Cited

U.S. PATENT DOCUMENTS 4,767,893 A * 8/1988 Ball et al. ..................... 174/84 R
5,047,594 A * 9/1991 Powell ......................... 174/88 R

FOREIGN PATENT DOCUMENTS

JP        2011-080862 A        4/2011

* cited by examiner

*Primary Examiner* — David Porta
*Assistant Examiner* — Shun Lee
(74) *Attorney, Agent, or Firm* — Buchanan Ingersoll & Rooney PC (57) ABSTRACT

In order to obtain a dose-rate measuring system that reduces an influence of an electromagnetic induction noise acting around an ionization chamber and a signal converter, a cabinet of the ionization chamber, shields of cables, a cabinet of the signal converter, and a cabinet of a measuring unit are connected in series, and a single-point ground is performed at the measuring unit, and other units except the grounded measuring unit are insulated from the earth, and moreover, a heatproof insulating material having water repellency is coated on a fixed portion of the ionization chamber, whereby the ionization chamber is electrically insulated from a chassis at a fixed side, and the heatproof insulating material having water repellency is coated on a connecting portion of a connector for connecting a cable to another cable, after a waterproof process is performed on the connecting portion by using a bonding tape.

3 Claims, 11 Drawing Sheets

DOSE-RATE MEASURING SYSTEM

BACKGROUND OF THE INVENTION

1. Field of the Invention

The present invention relates to a dose-rate measuring system which is installed in nuclear reactor facilities, nuclear fuel reprocessing facilities or the like, and uses an ionization chamber as a radiation detector.

2. Description of the Related Art

A conventional dose-rate measuring system includes an ionization chamber that detects a radiation incident from the outside and outputs ionization current; a current-signal cable that transmits the ionization current outputted from the ionization chamber; a high-voltage cable that supplies a high voltage so as to operate the ionization chamber; and a signal converter that converts the ionization current, which is inputted via the a current-signal cable, into a signal so as to output, and outputs the relayed high voltage to the high-voltage cable. In the dose-rate measuring system, connectors of a current-signal MI (mineral insulation) cable and a high-voltage MI cable are respectively connected to connectors of a current-signal cable and a high-voltage cable, and connecting portions of the connectors are waterproofed by bonding tapes. Moreover, in the dose-rate measuring system, a cabinet of the ionization chamber, a cable shield, a housing of the connectors, and a cabinet of the signal converter, which are respectively insulated, are connected in series, and a single-point ground is performed at a measuring unit, which receives a convert signal outputted from the signal converter and supplies a high voltage, and moreover, the insulated ionization chamber is fixed to a chassis (refer to Patent Document 1).

PATENT DOCUMENT

[Patent Document 1]
Japanese Laid-Open Patent Publication No. 2011-80862 (paragraphs from [0034] to [0035], and FIG. 3)

A conventional dose-rate measuring system is configured as described above, and the shield is connected in such a way that a single-point ground is performed at the measuring unit, whereby noise immunity is maintained. Therefore, in a case of an ionization chamber being installed at a field in which an environmental condition for temperature and humidity is severe, when an accident occurs, for example, in facilities, and condensation occurs on a surface of the ionization chamber and a surface of a chassis for fixing the ionization chamber in accordance with a rapid environmental change, the components are wetted by the condensation, whereby a grand fault, which is not expected, is occurred at the field. At this time, there have been problems in that two-point grounds occur at the ionization chamber and the measuring unit, and a closed loop between the shield and the ground is formed, whereby an electromagnetic noise easily invades. Moreover, when the ionization chamber is grounded at the field, a loop is formed in a state where a grounding current noise generated at the other facility is returned from the grounded field to a power-supply unit of the other facility via the shield, so that there has been a problem in that a trouble occurs in a measurement system operated as an original dose-rate measuring system (radiation monitor).

SUMMARY OF THE INVENTION

The present invention has been made to solve above-described problems, and an object of the invention is to reduce an influence of an electromagnetic induction noise acting around an ionization chamber and a signal converter.

A dose-rate measuring system of the present invention includes an ionization chamber that detects a radiation incident from the outside and outputs ionization current; a current-signal MI cable, which is fixed to a cabinet of the ionization chamber, for transmitting the ionization current that is outputted from the ionization chamber; a high-voltage MI cable, which is fixed to the cabinet of the ionization chamber, for supplying a high voltage, by which the ionization chamber is operated, to the ionization chamber; a current-signal cable, which is connected to the current-signal MI cable via a first connector, for transmitting the ionization current that is outputted from the ionization chamber; a high-voltage cable, which is connected to the high-voltage MI cable via a second connector, for supplying a high voltage to the ionization chamber; a signal converter, to which the ionization current is inputted from the current-signal cable, that converts the ionization current into a signal, which corresponds to the ionization current, so as to output the signal, and relays the high voltage to the high-voltage cable; and a measuring unit that converts the signal, which is inputted from the signal converter and corresponds to the ionization current, into a dose rate so as to display the dose rate, and outputs a high voltage to the signal converter; wherein a cabinet of the ionization chamber, shields of the cables, a cabinet of the signal converter, and a cabinet of the measuring unit, which are provided at positions of the ionization chamber, the current-signal MI cable, the high-voltage MI cable, the current-signal cable, the high-voltage cable, the signal converter, and the measuring unit, are connected in series, and a single-point ground is performed at the measuring unit, and other units except the grounded measuring unit are insulated from the earth, and moreover, a heatproof insulating material having water repellency is coated on a fixed portion of the ionization chamber, whereby the ionization chamber is electrically insulated from a chassis at a fixed side, and the heatproof insulating material having water repellency is coated on a first connecting portion of the first connector, which connects the current-signal MI cable to the current-signal cable, and on a second connecting portion of the second connector, which connects the high-voltage MI cable to the high-voltage cable, after a waterproof process is performed on each of the connecting portions by using a bonding tape.

According to the dose-rate measuring system of the present invention, even when an installation area of the ionization chamber is changed to a hot and humid condensation environment in an accident, the single-point ground for the measuring system is maintained in a state where repellent-water droplets, which are produced at the fixed portion of the ionization chamber and the connecting portions of the connectors, are not joined, and the grounded single point for a dose-rate measuring system is maintained. Therefore, an event, in which the dose-rate measuring system is damaged by a ground-fault noise and a leakage-current noise of the other facilities, which invade when multiple-point grounds occur in an accident, can be excluded, whereby a highly reliable dose-rate measuring system, in which reliability is not decreased in an accident environment, can be provided.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
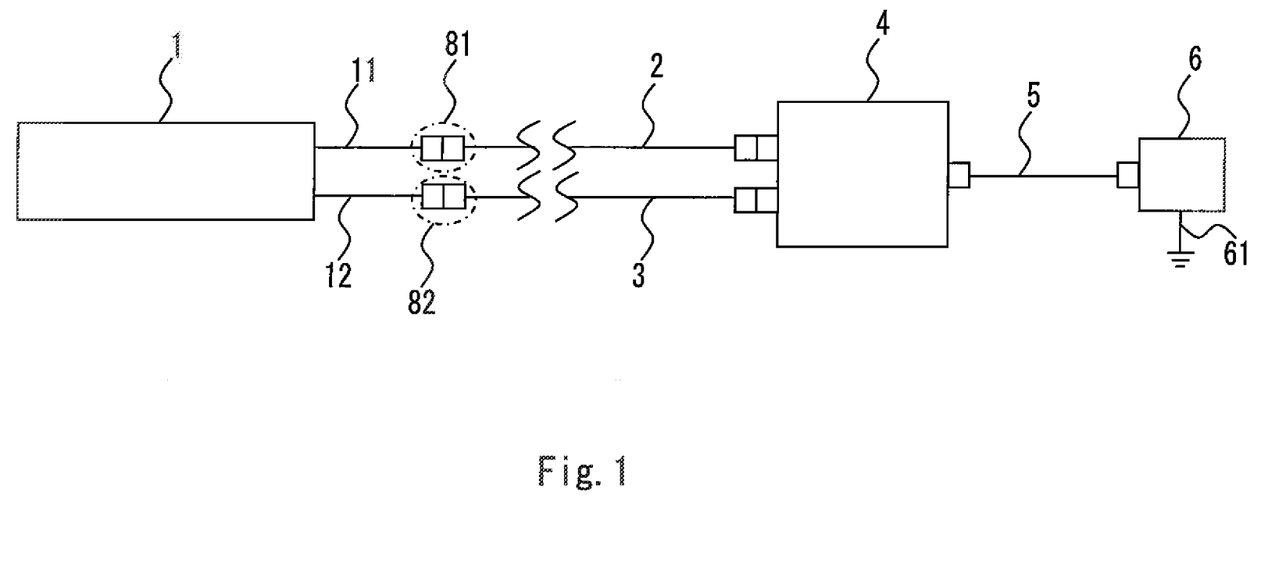
FIG. 1 is a block diagram illustrating a dose-rate measuring system according to Embodiment 1 of the present invention.

FIG. 1 is a block diagram illustrating a dose-rate measuring system according to Embodiment 1 of the present invention. In FIG. 1, an ionization chamber 1 detects a radiation incident from the outside and outputs ionization current. The ionization current outputted from the ionization chamber 1 is transmitted through a current-signal cable 2. A high-voltage cable 3 supplies a high voltage to the ionization chamber 1 so as to operate the ionization chamber 1. The ionization current transmitted through the current-signal cable 2 is inputted to a signal converter 4, and the signal converter 4 converts the ionization current into a voltage signal being proportional to, for example, logarithm of the current so as to output the voltage signal, and moreover, the signal converter 4 relays the high voltage to the high-voltage cable 3. A multiple cable 5 electrically connects the signal converter 4 and a measuring unit 6 so as to transmit the voltage signal to the measuring unit 6, and supplies the high voltage to the ionization chamber 1 via the signal converter 4 and the high-voltage cable 3. The measuring unit 6 outputs a high voltage and inputs the voltage signal, and moreover, the measuring unit 6 converts the voltage signal into a dose rate so as to display.

A cabinet of the ionization chamber 1, a shield of the current-signal cable 2, a shield of the high-voltage cable 3, a cabinet of the signal converter 4, a shield of the multiple cable 5, and a cabinet of the measuring unit 6, which are included in components from the ionization chamber 1 to the measuring unit 6, are connected in series, and a single-point ground is performed at the measuring unit 6 by a grounding cable 61, and other units except the grounded measuring unit 6 are insulated from the earth. The multiple cable 5 includes a special shield cables (not illustrated), used for a voltage signal and a high voltage, in a common shield, and each of the shields of the cables and the common shield are grounded at a single point on the cabinet of the measuring unit 6. The ionization chamber 1 placed in a field is insulated in such a way that the fixed portion of the ionization chamber 1 is not grounded. It is prevented by insulating the ionization chamber 1 that a ground-fault current of the other facility or a stray current, as a noise current, is invaded from the single-point ground at the measuring unit 6 and the undesirable ground at the field. In addition, the signal converter 4 converts the ionization current into a signal corresponding to the ionization current so as to output the signal. Instead of converting the ionization current into the voltage signal being proportional to a logarithm of the current, the converted signal may be changed in accordance with a combination with the measuring unit 6 or, for example, the ionization current may be converted into a pulse signal having a repeating frequency being proportional to the current so as to be outputted.

Figure 2:
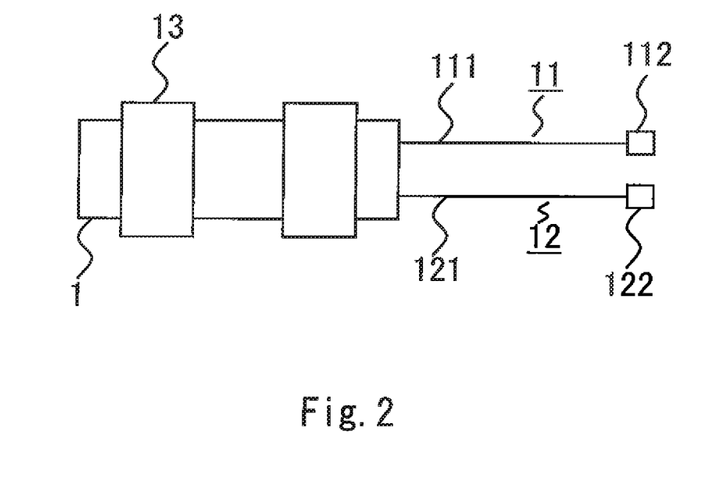
FIG. 2 is a block diagram for explaining an insulation process and a water-repellent process for an ionization chamber according to Embodiment 1.

FIG. 2 is a block diagram for explaining an insulation process and a water-repellent process for of the ionization chamber 1. In addition, reference symbols, which are the same as those in each of FIG. 1 and FIG. 2, refer to the same or equivalent parts. In FIG. 2, a shield outer sheath (stainless steel) of a current-signal MI (mineral insulation) cable 11 for outputting the ionization current and a shield outer sheath (stainless steel) of a high-voltage MI cable 12 for inputting a high voltage are welded to the cabinet of the ionization chamber 1. A fluorine-resin tape 13, used as a heatproof-insulation material having water repellency, is wrapped around, in other words, coated on a portion of the ionization chamber 1, on which the ionization chamber 1 is fixed to a chassis, whereby the ionization chamber 1 is electrically insulated from the fixed side. The fluorine-resin tape 13, of which heat resistance is exceeded 150° C. (preferably exceeded 200° C.), is used. In addition, character "MI" of the MI cable means "mineral insulation", and a cable used as the MI cable is formed in such a way that, for example, bare copper-core wires are installed in a stainless steel tube, and a mineral insulation material, such as magnesium oxide, is crammed among the wires.

Figure 3:
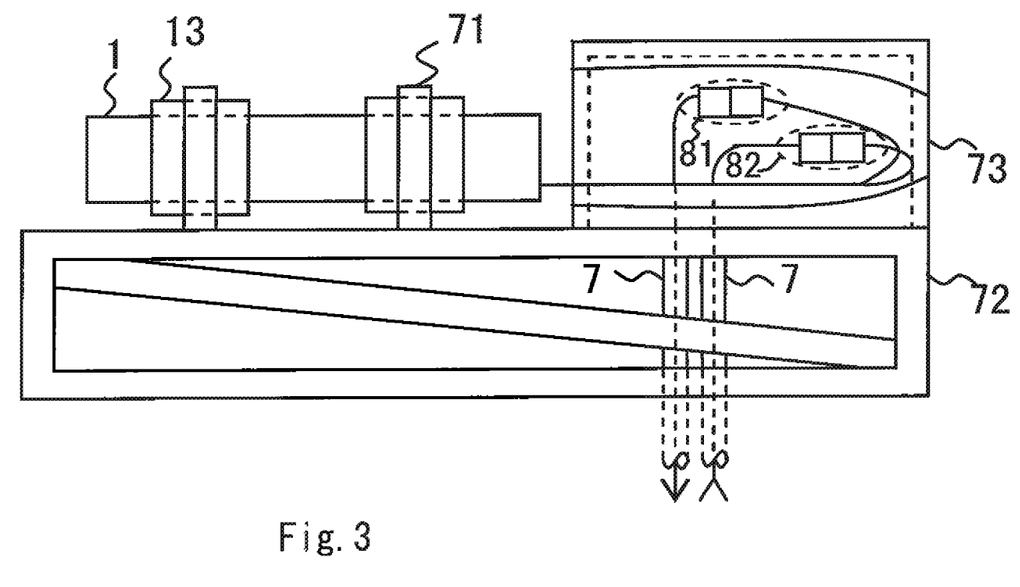
FIG. 3 is a block diagram illustrating a fixing component and neighboring components of the ionization chamber according to Embodiment 1.

FIG. 3 is a block diagram illustrating a fixing component and neighboring components of the ionization chamber 1. The taped portion is fixed to a chassis 72 by a fixing block 71, and a creepage distance between the non-taped portion of the ionization chamber 1 and the fixing block 71 is maintained, whereby a repellent-water droplet on a surface of the fluorine-resin tape 13 is freely dropped, and the ionization chamber 1 is prevented from being wetted and grounded. At this time, the current-signal MI cable 11 and the high-voltage MI cable 12 are isolated and held without contacting to the fixing block 71, the chassis 72, and a cable protecting chamber 73. When outer coats of the cables are made of a stainless steel tube, the cables can be jutted and isolated from the ionization chamber 1 by shaping the outer coats, and the shapes of the cables can be maintained. The symbol "7" indicates electric-wire tubes. In FIG. 2, the ionization chamber 1 includes the cabinet and has a shield structure in which the number of layers is equal to or more than a single. Each of the core wires of the current-signal MI cable 11 and the high-voltage MI cable 12 are insulated by a mineral material (magnesium oxide or the like). Moreover, connectors 112 and 122 are respectively connected to MI cables 111 and 121 having a coaxial structure, on which a shield having a single layer or multiple layers is formed in accordance with the shield of the ionization chamber 1, and connected to end portions of the MI cables 111 and 121. The shield of the ionization chamber 1 is connected to the shields of the MI cables 111 and 121.

Figure 4:
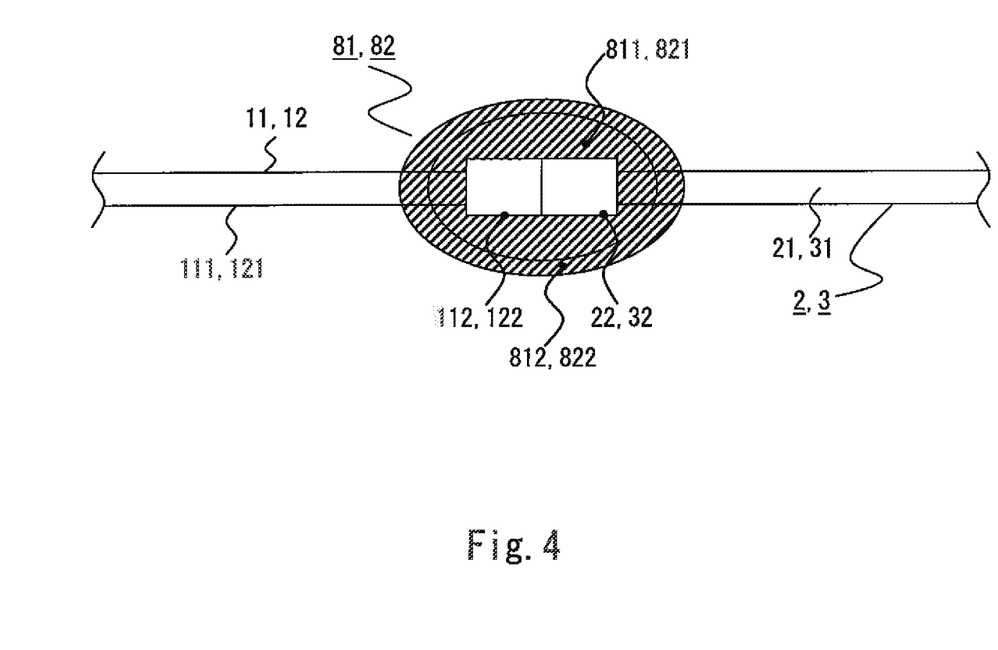
FIG. 4 is a block diagram for explaining a waterproof process and a water-repellent process for connecting portions of connectors according to Embodiment 1.

FIG. 4 is a block diagram for explaining a waterproof process and a water-repellent process for connecting portions of connectors. Although two cables—the current-signal cable 2 and the high-voltage cable 3—exist in the system, one cable of those cables is illustrated in FIG. 4, and symbols of two cables are illustrated. In FIG. 4, each of the core wires of the current-signal cable 2 and the high-voltage cable 3 is insulated by a plastic, and connectors 22 and 32 are respectively connected to cable main units 21 and 31, on which a shield having a single layer or multiple layers is formed in accordance with the shields of the MI cables 111 and 121 of the ionization chamber 1, and connected to end portions of the cable main units 21 and 31. The connector 112 of the current-signal MI cable 11 and the connector 122 of the high-voltage MI cable 12 are respectively connected to the connector 22 of the current-signal cable 2 and the connector 32 of the high-voltage cable 3. The shield of the current-signal MI cable 11 and the shield of the high-voltage MI cable 12 respectively connected, in series via the connecting portions, to the shield of the current-signal cable 2 and the shield of the high-voltage cable 3.

Bonding tapes 811 and 821 are respectively wound around a connecting portion 81 for the connectors 112 and 22 and a connecting portion 82 for the connectors 122 and 32 so as to waterproof the connecting portions, and moreover, fluorine-resin-heat-shrinkable tubes 812 and 822, used as a heatproof insulating material having water repellency, are closely wrapped on the bonding tapes 811 and 821. When the bonding tapes 811 and 821 are strongly overlapped, the overlapped portions are integrally bonded, so that the waterproof capability of the connecting portions is suitable. The tapes having heat resistance, which is exceeded 150° C. or is preferably exceeded 200° C., are used. The connecting portions 81 and 82 of the connectors are isolated and arranged without contacting to any of the neighboring components illustrated in FIG. 3, whereby repellent-water droplets on surfaces of the fluorine-resin-heat-shrinkable tubes 812 and 822 are freely dropped, and the current-signal MI cable 11 and the high-voltage MI cable 12 are prevented from being grounded even if those are wetted.

Figure 5:
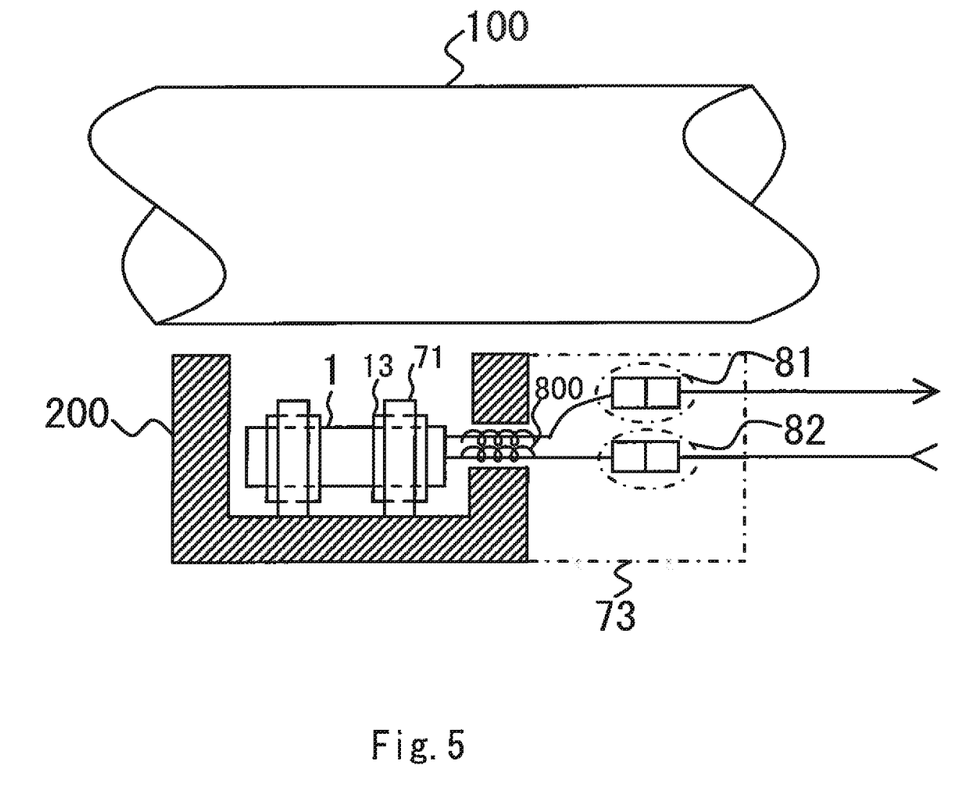
FIG. 5 is a block diagram illustrating a measured object and the neighboring components of the ionization chamber according to Embodiment 1.
Figure 6:
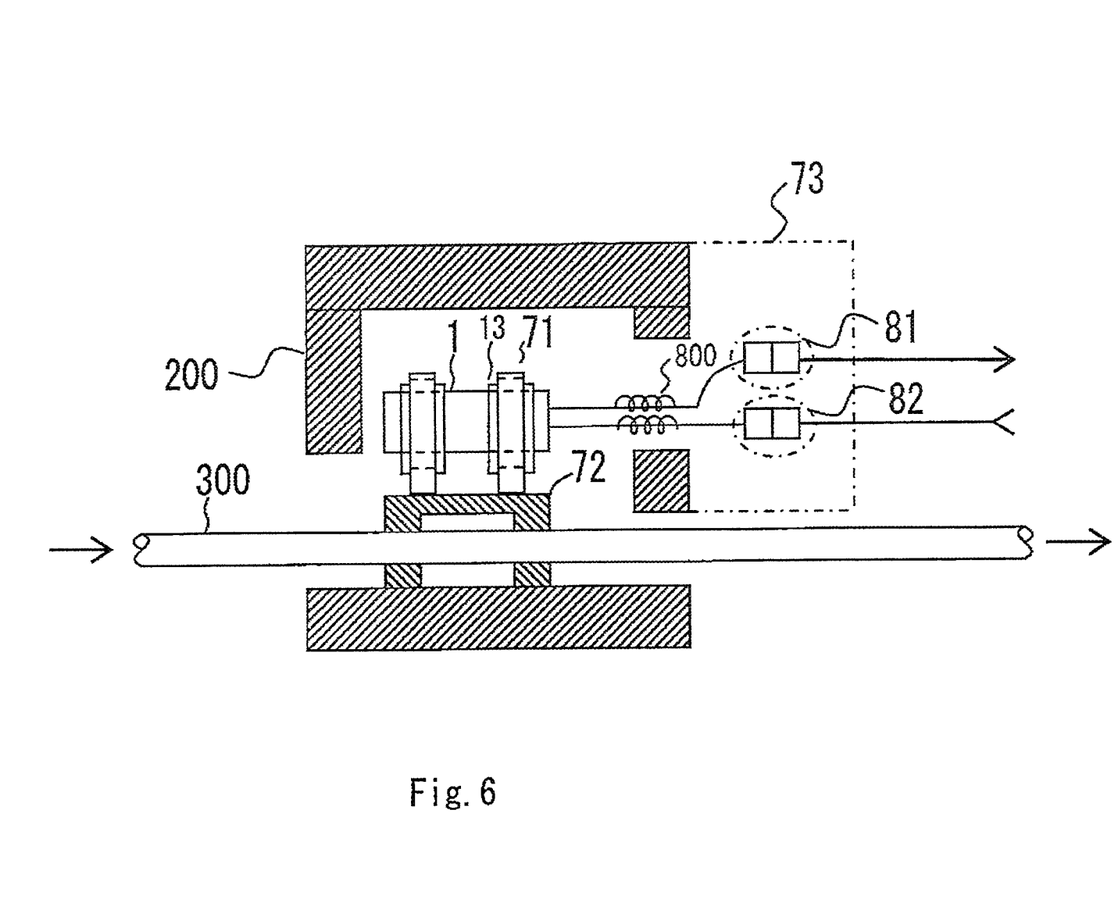
FIG. 6 is a block diagram illustrating the measured object and other neighboring components of the ionization chamber according to Embodiment 1.

In this state, the creepage distance between the non-taped portion of the ionization chamber 1 and the fixing block 71 and lengths of the fluorine-resin-heat-shrinkable tubes 812 and 822, which are required for maintaining the insulation, can be verified by an experiment. FIG. 5 and FIG. 6 are block diagrams illustrating each of measured objects and the neighboring components of the ionization chamber 1. In FIG. 5, the measured object is a radioactive noble gas in a main-steam tube 100, and a radiation concentration of the radioactive noble gas is measured in such a way that the radiation concentration corresponds to a dose rate. A lead-shield unit 200 shields gamma rays incident from units except the main-steam tube 100, and the lead-shield unit 200 is used as a window for defining a measured-object length of the main-steam tube 100 in itself. The symbol "800" indicates a spiral-insulation tube. Moreover, in FIG. 6, the measured object is a radioactive noble gas in a sample-gas pipe 300, and a radiation concentration of the radioactive noble gas is measured in such a way that the radiation concentration corresponds to a dose rate. The lead-shield unit 200 shields gamma rays incident from the environment. In any case, the neighboring components close to the ionization chamber 1, so that the current-signal MI cable 11 and the high-voltage MI cable 12 are respectively covered by the spiral-insulation tube 800 so as to be insulated.

As described above, the ionization chamber 1 is fixed after the insulation process and the water-repellent process are performed on the fixing portion by using a material which endures high temperatures. The water-repellent process is performed on each of the connecting portions 81 and 82 after the waterproof process is performed by using the material which endures high temperatures, and moreover, the connecting portions 81 and 82 of the connectors are isolated and wired without contacting to any of the neighboring components, which may be grounded, of the ionization chamber 1. Thereby, repellent-water droplets are freely dropped without joining each other, so that the single-point ground for the measuring system is maintained, even when an installation area of the ionization chamber 1 is changed to a hot and humid condensation environment in an accident. Therefore, an event, in which the dose-rate measuring system is damaged by a ground-fault noise and a leakage-current noise of the other facilities, which invade when multiple-point grounds occur in an accident, can be excluded, and a highly reliable dose-rate measuring system, in which reliability is not decreased in an accident environment, can be provided.

Embodiment 2

Figure 7:
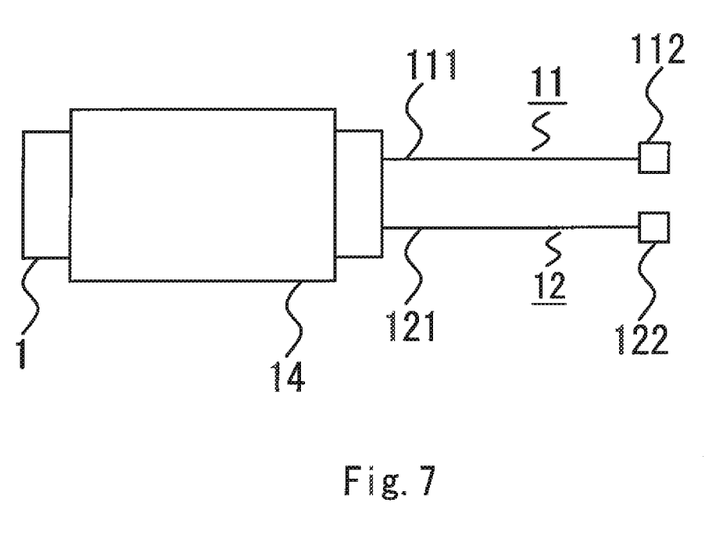
FIG. 7 is a block diagram for explaining an insulation process and a water-repellent process for an ionization chamber according to Embodiment 2.

In Embodiment 1, the insulation process and the water-repellent process are performed on the ionization chamber 1 by using the fluorine-resin tape 13, whereas in Embodiment 2 as illustrated in FIG. 7, a fluorine-resin-heat-shrinkable tube 14 covers most portions, which include the fixed portion of a ionization chamber 1, of the cabinet of the ionization chamber 1 so as to perform an insulation process and a water-repellent process. Therefore, on a severe condition that the ionization chamber 1 temporarily gets wet by water or heavy condensation occurs by ejected steam, even when repellent-water droplets are temporarily joined on a surface of the fluorine-resin-heat-shrinkable tube 14 which covers a wide area of the body of the ionization chamber 1, the repellent-water droplets are immediately separated, and a single-point point for a system can be maintained, so that a dose-rate measuring system having higher reliability can be obtained.

Embodiment 3

Figure 8:
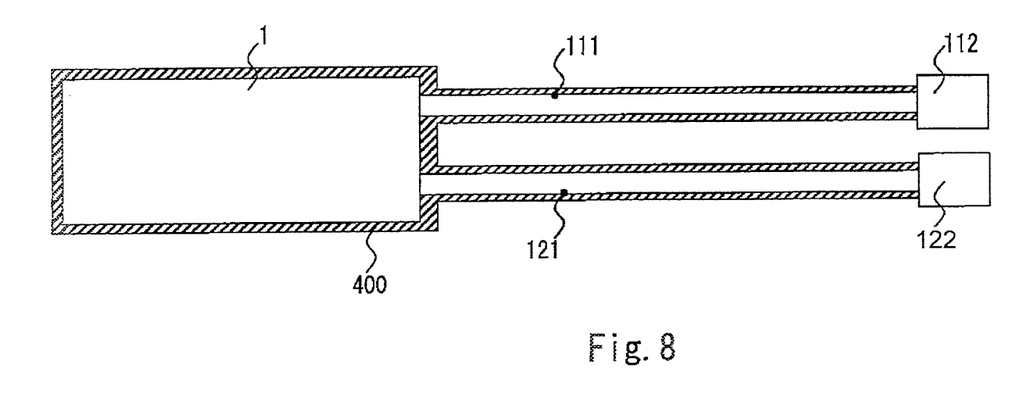
FIG. 8 is a block diagram for explaining an insulation process and a water-repellent process for an ionization chamber according to Embodiment 3.

In Embodiment 1, the heatproof insulating material having water repellency is wrapped around the fixed portion on the ionization chamber 1. In addition to the process, in Embodiment 3 as illustrated in FIG. 8, a heatproof-insulation-coating layer 400, such as a polyimide, is formed on a whole surface of a cabinet of an ionization chamber 1 and whole surfaces of MI cables 111 and 121. The coating layer having heat resistance, which is exceeded 150° C. or is preferably exceeded 200° C., is used. Even when the ionization chamber 1 and connecting portions 81 and 82 of a connector are set in a severe condition in which water is temporally flooded on the components, a single-point ground for a system can be maintained, so that a dose-rate measuring system having higher reliability can be obtained. In addition, it is needless to say that the reliability of the dose-rate measuring system is enhanced when a heatproof-insulation-coating layer having water repellency, such as a poly-para-xylene resin or a fluorine resin, is used instead of using a heatproof-insulation-coating layer, such as a polyimide.

Embodiment 4

Figure 9:
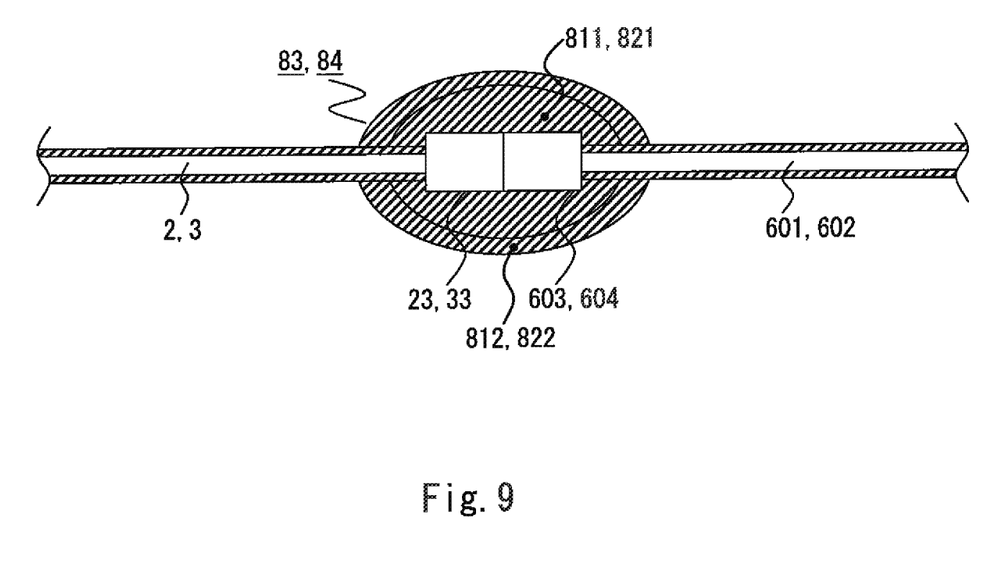
FIG. 9 is a block diagram for explaining a waterproof process and a water-repellent process for connecting portions of connectors according to Embodiment 4.
Figure 10:
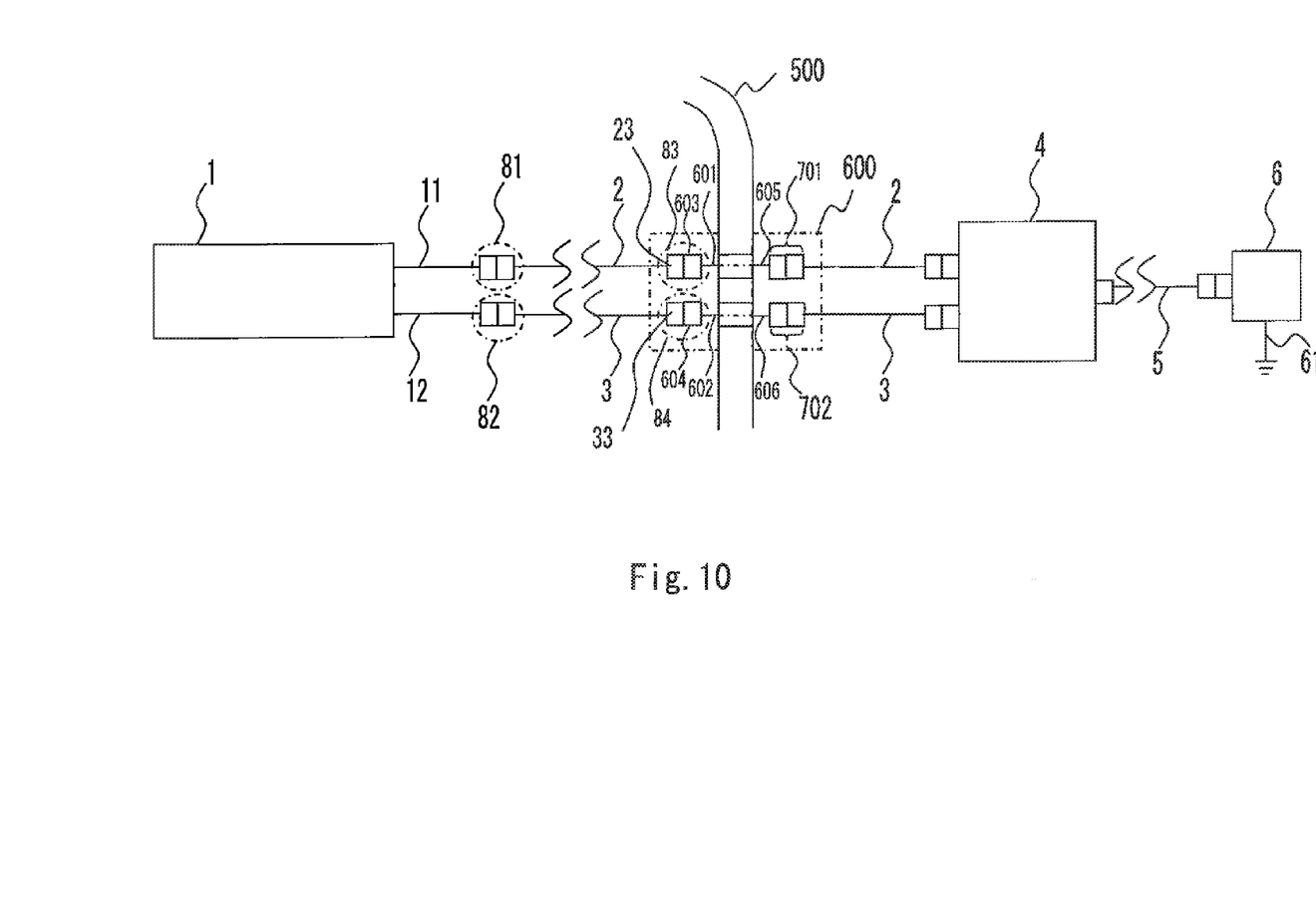
FIG. 10 is a block diagram illustrating a dose-rate measuring system according to Embodiment 4.

Embodiment 4 indicates a deformed example of Embodiment 1. As illustrated in FIG. 10, Embodiment 4 indicates a high-range-area monitor for a containment vessel in a case where an ionization chamber 1 is installed in a containment vessel 500 of a pressurized-water-nuclear-power plant. The input-output cables are connected to a signal converter 4, which is positioned at the outside of the containment vessel 500, via a penetration unit 600 of the containment vessel 500. In the penetration unit 600, connectors 603 and 604, which are respectively connected to end portions of the cables 601 and 602 positioned at the inside of the containment vessel 500, are respectively connected to a connector 23 of a current-signal cable 2 and a connector 33 of a high-voltage cable 3. As illustrated in FIG. 9, connecting portions 83 and 84 of connectors, on which a waterproof and insulation process are performed, are provided in a similar way of providing the connecting portions 83 and 84 of connectors (refer to FIG. 4). In addition, although two cables—a current-signal cable 2 and a high-voltage cable 3—exist in FIG. 9, one of the cables is illustrated in FIG. 9, and symbols of the two cables are illustrated. Cables 605 and 606 as well as connecting portions 701 and 702 of connectors are provided at the outside, in the penetration unit 600, of the containment vessel 500. It is determined in accordance with an environment condition that the waterproof process and the insulation process on the connecting portions 701 and 702 of connectors are necessary or not. As described above, when the water-repellent process, the waterproof process, and insulation process are performed on an exposed metal portion, a single-point ground for a system is maintained in a caustic-soda-spray environment in the containment vessel 500 in an accident, and a dose-rate measuring system having high ability can be obtained.

Embodiment 5

Figure 11:
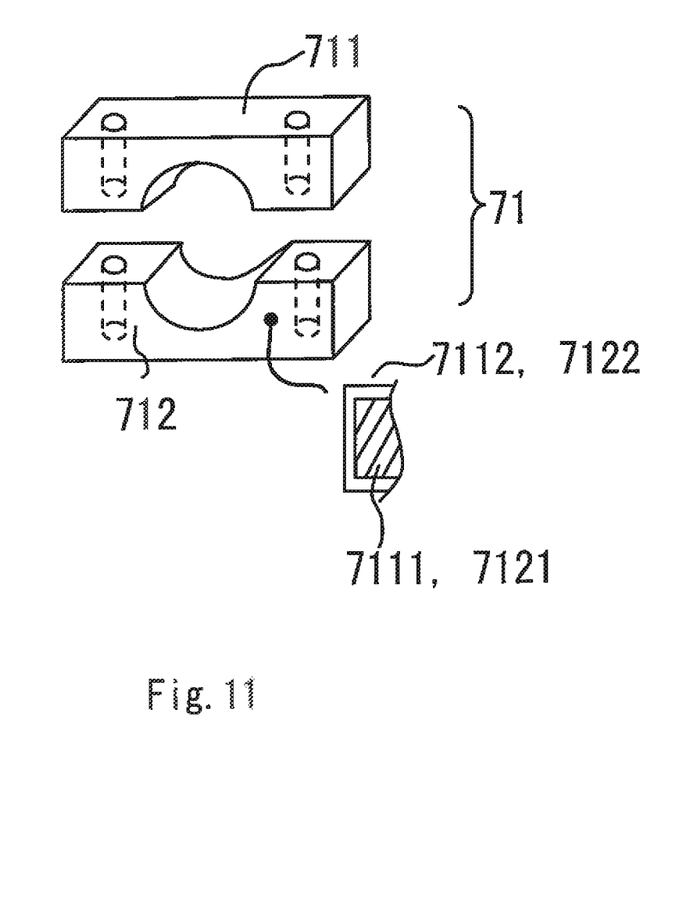
FIG. 11 is a block diagram illustrating a fixing block according to Embodiment 5.

FIG. 11 is a block diagram illustrating a fixing block 71 for fixing an ionization chamber 1 to a chassis by bolts. The fixing block 71 is illustrated in an oblique perspective view. Symbol "711" indicates an upper block, and symbol "712" indicates a lower block, and main bodies 7111 and 7121, which are illustrated in a cross-sectional view, are made of, for example, stainless steel. Volatile heatproof-insulation-coating layers 7112 and 7122 are respectively formed on the main bodies. A poly-para-xylene resin or a fluorine resin, which has water repellency, is used as the volatile heatproof-insulation-coating layers. The ionization chamber 1, on which the water-repellent process is performed in Embodiment 2 and Embodiment 3, is fixed by the fixing block 71 including the coating layers having water repellency, whereby insulation reliability of the ionization chamber 1 is more enhanced, and reliability of a single-point ground for a system in a severe condition can be improved.

In addition, in the scope of the present invention, it is possible that each of embodiments is freely combined, or each of embodiments is suitably modified or omitted.

What is claimed is:

1. A dose-rate measuring system comprising:
an ionization chamber that detects a radiation incident from the outside and outputs ionization current;
a current-signal MI cable, which is fixed to a cabinet of the ionization chamber, for transmitting the ionization current that is outputted from the ionization chamber;
a high-voltage MI cable, which is fixed to the cabinet of the ionization chamber, for supplying a high voltage, by which the ionization chamber is operated, to the ionization chamber;
a current-signal cable, which is connected to the current-signal MI cable via a first connector, for transmitting the ionization current that is outputted from the ionization chamber;
a high-voltage cable, which is connected to the high-voltage MI cable via a second connector, for supplying a high voltage to the ionization chamber;
a signal converter, to which the ionization current is inputted from the current-signal cable, that converts the ionization current into a signal, which corresponds to the ionization current, so as to output the signal, and relays the high voltage to the high-voltage cable; and
a measuring unit that converts the signal, which is inputted from the signal converter and corresponds to the ionization current, into a dose rate so as to display the dose rate, and outputs a high voltage to the signal converter; wherein
the cabinet of the ionization chamber, a shield provided for the current-signal MI cable, a shield provided for the high-voltage MI cable, a shield provided for the current-signal cable, a shield provided for the high-voltage cable, a cabinet provided for the signal converter, and a cabinet provided for the measuring unit, are connected in series, and a single-point ground is performed only at the measuring unit, and moreover, a heat-resistant insulating material having water repellency is coated on a fixed portion of the ionization chamber, whereby the ionization chamber is electrically insulated from a chassis at a fixed side, and the heat-resistant insulating material having water repellency is coated on a first connecting portion of the first connector, which connects the current-signal MI cable to the current-signal cable, and on a second connecting portion of the second connector, which connects the high-voltage MI cable to the high-voltage cable, after a waterproof process is performed on each of the connecting portions by using a bonding tape, and
wherein the heat-resistant insulating material is provided only in the vicinity of the fixed portion of the ionization chamber to the chassis, so that a portion of an outer surface of the ionization chamber other than at the vicinity of the fixed portion is without the heat-resistant insulating material.

2. A dose-rate measuring system comprising:
an ionization chamber that detects a radiation incident from the outside and outputs ionization current;
a current-signal MI cable, which is fixed to a cabinet of the ionization chamber, for transmitting the ionization current that is outputted from the ionization chamber;
a high-voltage MI cable, which is fixed to the cabinet of the ionization chamber, for supplying a high voltage, by which the ionization chamber is operated, to the ionization chamber;
a current-signal cable, which is connected to the current-signal MI cable via a first connector, for transmitting the ionization current that is outputted from the ionization chamber;
a high-voltage cable, which is connected to the high-voltage MI cable via a second connector, for supplying a high voltage to the ionization chamber;
a signal converter, to which the ionization current is inputted from the current-signal cable, that converts the ionization current into a signal, which corresponds to the ionization current, so as to output the signal, and relays the high voltage to the high-voltage cable; and
a measuring unit that converts the signal, which is inputted from the signal converter and corresponds to the ionization current, into a dose rate so as to display the dose rate, and outputs a high voltage to the signal converter; wherein
the cabinet of the ionization chamber, a shield provided for the current-signal MI cable, a shield provided for the high-voltage MI cable, a shield provided for the current-signal cable, a shield provided for the high-voltage cable, a cabinet provided for the signal converter, and a cabinet provided for the measuring unit, are connected in series, and a single-point ground is performed only at the measuring unit, and moreover, a heat-resistant insulating material having water repellency is coated on a fixed portion of the ionization chamber, whereby the ionization chamber is electrically insulated from a chassis at a fixed side, and the heat-resistant insulating material having water repellency is coated on a first connecting portion of the first connector, which connects the current-signal MI cable to the current-signal cable, and on a second connecting portion of the second connector, which connects the high-voltage MI cable to the high-voltage cable, after a waterproof process is performed on each of the connecting portions by using a bonding tape, and wherein a fixing block attaches the ionization chamber at the fixed portion to the chassis, an outer surface of the ionization chamber has a portion that is without the heat-resistant insulating material, and a creepage distance is provided between the fixing block and the portion that is without the heat-resistant insulating material.

3. A dose-rate measuring system comprising:

an ionization chamber that detects a radiation incident from the outside and outputs ionization current;

a current-signal MI cable, which is fixed to a cabinet of the ionization chamber, for transmitting the ionization current that is outputted from the ionization chamber;

a high-voltage MI cable, which is fixed to the cabinet of the ionization chamber, for supplying a high voltage, by which the ionization chamber is operated, to the ionization chamber;

a current-signal cable, which is connected to the current-signal MI cable via a first connector, for transmitting the ionization current that is outputted from the ionization chamber;

a high-voltage cable, which is connected to the high-voltage MI cable via a second connector, for supplying a high voltage to the ionization chamber;

a signal converter, to which the ionization current is inputted from the current-signal cable, that converts the ionization current into a signal, which corresponds to the ionization current, so as to output the signal, and relays the high voltage to the high-voltage cable; and a measuring unit that converts the signal, which is inputted from the signal converter and corresponds to the ionization current, into a dose rate so as to display the dose rate, and outputs a high voltage to the signal converter; wherein the cabinet of the ionization chamber, a shield provided for the current-signal MI cable, a shield provided for the high-voltage MI cable, a shield provided for the current-signal cable, a shield provided for the high-voltage cable, a cabinet provided for the signal converter, and a cabinet provided for the measuring unit, are connected in series, and a single-point ground is performed only at the measuring unit, and moreover, a heat-resistant insulating material having water repellency is coated on a fixed portion of the ionization chamber, whereby the ionization chamber is electrically insulated from a chassis at a fixed side, and the heat-resistant insulating material having water repellency is coated on a first connecting portion of the first connector, which connects the current-signal MI cable to the current-signal cable, and on a second connecting portion of the second connector, which connects the high-voltage MI cable to the high-voltage cable, after a waterproof process is performed on each of the connecting portions by using a bonding tape, and wherein the ionization chamber is attached to the chassis via a fixing block at the fixed portion, and the first connecting portion and the second connecting portion are isolated in a cable protecting chamber from the chassis and the fixing block.

* * * * *